United States Patent [19]
Lauer et al.

[11] Patent Number: 5,622,624
[45] Date of Patent: Apr. 22, 1997

[54] FILTER ELEMENT WITH EXPANDABLE METAL JACKET

[75] Inventors: Viktor Lauer, Bilsdorf; Matthias Schwender, Kirkel, both of Germany

[73] Assignee: HYDAC Filtertechnik GmbH, Sulzbach, Germany

[21] Appl. No.: 513,901

[22] PCT Filed: Feb. 19, 1994

[86] PCT No.: PCT/EP94/00485

§ 371 Date: Sep. 7, 1995

§ 102(e) Date: Sep. 7, 1995

[87] PCT Pub. No.: WO94/23818

PCT Pub. Date: Oct. 27, 1994

[30] Foreign Application Priority Data

Apr. 20, 1993 [DE] Germany .................. 43 12 705.3

[51] Int. Cl.⁶ .................. B01D 27/06; B01D 29/07; B01D 29/21; B01D 39/12
[52] U.S. Cl. .................. 210/232; 210/492; 210/493.1; 210/493.5; 210/507; 55/498; 55/521; 55/525
[58] Field of Search .................. 210/232, 493.1, 210/493.5, 493.2, 493.3, 492, 507; 55/497, 498, 499, 525, 521

[56] References Cited

U.S. PATENT DOCUMENTS

| | | |
|---|---|---|
| 3,283,904 | 11/1966 | Buckman . |
| 3,407,252 | 10/1968 | Pall . |
| 3,570,675 | 3/1971 | Pall . |
| 3,591,010 | 7/1971 | Pall . |
| 3,752,321 | 8/1973 | McLaren .................. 210/493 |
| 3,865,919 | 2/1975 | Pall . |
| 4,184,966 | 1/1980 | Pall . |
| 4,268,289 | 5/1981 | Polaner . |
| 4,419,241 | 12/1983 | Hoffman . |
| 4,512,892 | 4/1985 | Ganzi . |
| 4,663,041 | 5/1987 | Miyagi . |
| 4,735,720 | 4/1988 | Kersting . |
| 5,114,508 | 5/1992 | Miyagi . |
| 5,360,650 | 11/1994 | Grimes . |
| 5,409,606 | 4/1995 | Spencer . |

FOREIGN PATENT DOCUMENTS

| | | |
|---|---|---|
| 742053 | 9/1966 | Canada . |
| 857866 | 10/1940 | France . |
| 750396 | 6/1956 | United Kingdom . |
| 2101902 | 1/1983 | United Kingdom . |

*Primary Examiner*—Thomas M. Lithgow
*Attorney, Agent, or Firm*—Roylance, Abrams, Berdo & Goodman, L.L.P.

[57] ABSTRACT

A tubular filter element for filtering fluids includes a zigzag folded filter mat having rounded off mat ends. The mat ends face one another and are located in fixed positions. A bed of adhesive connects and bonds the mat ends. A cylindrical expandable metal grid surrounds at least one side of the filter mat and forms an expandable metal jacket. The metal jacket has a small mesh width and protectively surrounds the filter mat. The metal jacket has bent jacket ends defining the bed of adhesive and extends radially inwardly. The jacket ends face one another to define a space receiving the mat ends. The mat ends and the jacket ends extend substantially parallel.

8 Claims, 3 Drawing Sheets

FILTER ELEMENT WITH EXPANDABLE METAL JACKET

FIELD OF THE INVENTION

The present invention relates to a tubular filter element for filtering fluids or liquids with a zigzag folded filter mat. The two bent down or rounded off ends of the filter mat facing one another are connected by a bed of adhesive and are fixed in their position. The filter mat is surrounded at least on one side by a cylindrical expandable metal grid.

BACKGROUND OF THE INVENTION

Such filter elements filter fluids, liquids or solutions of any sort, for instance in the form of true suspensions, dispersions, emulsions or colloidal solutions. The filter elements have been proven to be generally useful on account of their compact structure, combined with their large filter surface. To guarantee that the fluid stream flows only through the proper filter and not elsewhere, the connecting fold, incorporating the two ends of the filter mat facing one another adjacent to the sealing on the end casings in the form of webs or fillets at the ends, forms one of the critical points which are to be sealed off and leak-proof.

Known filter elements have a zigzag folded or pleated filter mat composed of various filter materials. The mat is arranged around a solid support pipe mounted in the interior of the filter element and provided with passages, and is protected against damage from the outside by a fine-mesh wire meshing following the shape of the folds of the filter mat. The connection of the filter mat with the protective wire meshing is costly in construction, and therefore, is expensive. Also, the filter mat itself is not completely protected from damage. The wire meshing projecting out from the assembly can lead to injuries to operators during the handing required, for instance, during filter exchange.

The known wired meshing can absorb only low-level forces. The filter element can eventually bulge out and become useless, as soon as the direction of flow, for instance during a reverse flow step, is reversed to come from the inside to the outside. Since the wire meshing is directly in contact with the outside layer of the filter mat, a resistant filter material is selected for this purpose, in order to avoid damage to the filter mat. Such a resistant material will also have good passage and filtering properties, such as for example sensitive filter materials made of polyester, fiberglass or paper fleece, which is not available. Since the wire meshing is also of considerable mesh spacing, metal splinters and other polluting particles can damage the sensitive filter material and might negatively influence the filtering performance to a great extend.

The Italian company ITALDIM S.P.A. headquartered in Bergamo has already suggested, in a filter element for this type of use, that the zigzagging filter mat can be surrounded with a cylindrical expandable metal grid on the exterior. The filter can be composed of sensitive, but even more effective filter materials, solely by use of the wide-mesh expandable metal grid in the known arrangement. However, problems arise of limited pressure stability. Also, the filter mat is not protected from damage. With use of the wide-mesh grid in this case too, there is danger of injury to the operator, especially when metal splinters or the like have been caught and held in the mesh of the fabric.

In this known solution, the ends of the cylindrical expanded metal grid are flush with one another and are point-welded or flat-welded together. This arrangement is costly and requires considerable outlay in the manufacture. The reverse side surface of the sensitive filter mat can be damaged by heat application or by formation of sparks. Furthermore, the construction of this type of connection requires a relatively extensive surface area on the exterior peripheral side of the expanded metal grid. Thus, this area is no longer available as a filtration surface.

In European Patent Specification Nos. 0 139 822 A2, 0 440 352 A2, 0 001 407 B1 and 0 062 867 B1, and from German Patent No. 31 28 546 C2, other types of filter elements are disclosed. Longitudinal seam clamps either surround or even engage directly in the two ends of the filter mat which face one another, in order to be subsequently heat-welded together with the longitudinal seam clamp. In this manner, very solid and leak-free connections of the free ends of the filter mat are attained. However, the manufacturing method is costly. Besides, the selection of material for the composition/construction of the filter mat is limited. Only certain materials, such as plastics, which can be subjected successfully to heat processing, can be used.

In other filter elements, disclosed in German publication No. 2 417 551 and British Patent No. 750 396, metallic, shell-shaped longitudinal seam clamps are known receive the ends of the curving filter material forming the filter mat. A liquid, adhesive material or a casting resin having two components is used to connect the members. The adhesive material can be processed at room temperature, so that the use of a destructive level of heat is avoided.

In another filter element, according to U.S. Pat. No. 4,512,892, following production of the adhesive bed by means of the shell-shaped longitudinal seam clamps, the clamps can be removed. Two installation aids can be provided in the form of members which serve as additional side boundaries for the adhesive bed. These two installation aids are nonporous and are installed around the final curve in the design, where they serve in the form of clamps in the end area of the filter mat where the ends overlap. The adhesive agent does not advance further in the filtering area of the filter mat because of capillary effect, having a negative influence on the filtering capacity or performance.

The aforementioned other filter elements at least sometimes are provided with a shell-shaped longitudinal seam clamp. The filter mat is not protected from damage from the outside, for example, particularly not during transport and construction. During operational use, the mat is not sufficiently pressure-stable. The operator is not secure from injury during exchange of the filter element, insofar as sharp-edged small parts, such as metal splinters, have been set and secured in the filter mat. Since the filter mat is the only filter, this filter mat can be rapidly polluted with the resulting small rejected parts, which considerably lowers the filtering performance capacity. Additional, the life of the known filter element is shortened considerably.

SUMMARY OF THE INVENTION

An object of the present invention is to provide a tubular filter element which does not include the above described disadvantages and drawbacks, and is pressure-stable especially during operation, and allows for high filtration performance and a long life.

Another object of the present invention is to provide a tubular filter element which, during exchange of the filter element by an operator, avoids the danger of injury.

The foregoing objects are basically obtained by a tubular filter element for filtering fluids, comprising a zigzag folded filter mat having rounded off mat ends, a bed of adhesive connecting and binding the mat ends, and a cylindrical expandable metal grid surrounding at least one side of the filter mat and forming a first expandable metal jacket. The mat ends face one another and are located in fixed positions. The metal jacket has a small mesh width and protectively surrounds the filter mat. The metal jacket has bent jacket ends defining the bed of adhesive therebetween, and extends radially inwardly. The jacket ends face one another to define a space therebetween receiving the mat ends. The mat ends and the jacket ends extend substantially parallel.

By forming the filter element in this manner, the drawbacks described above are avoided. Because of its small mesh width or narrow pores, the expandable metal jacket has an essentially smooth, uniform surface, so that good hold and engagement and thus protection during transport is attained, and especially the danger of injury to the operator is avoided.

The expandable metal jacket and its secure attachment at the end obtained by means of its downward bent or rounded off ends are configured in a rigid manner. Especially during reversing processes, in other words, during reverse flow setting of the filter mat, the filter element cannot be inflated. Metal splinters or other waste pollutants are securely held back from the filter mat by the expandable metal jacket, so that damage to the effective performance of the filter material is not to be feared. Since the expandable metal jacket is located in the interior, directly adjacent to the filter mat, a smooth surface is obtained in the interior. The filter mat makes contact with the jacket at the points of the fold and hence engages flush against the expandable metal. Filter materials for the filter mat can be used which are sensitive, but are still highly effective in terms of filtration performance.

Also, a sort of pre-filtration is accomplished because of the meshes or pores of the expandable metal jacket. This improves the filtration results of the filter element overall. Thus, flowthrough-reversal fatigue resistance is increased in the filter element according to the present invention, because of the expandable metal jacket. The stability of beta-value is increased overall.

As a result of the space-saving connection of the ends of expandable metal jacket and filter element by the adhesive bed in a narrow area, in which the ends of the filter mat are arranged between the ends of the expandable metal jacket and/or extending parallel to this jacket, formation of a connection without using any destructive heat influence is possible. The desired leak-proof connection can be manufactured at low cost and with a simple manufacturing method. The adhesive connection produced in this manner also holds extremely well. Tearing out of the ends of the filter mat is certainly avoided by this arrangement. Furthermore, on the basis of this space-saving connection, only a small quantity of material required for the filtration is used to increase the filtration performance of the filter element.

In one preferred embodiment of the filter element of the present invention, the expandable metal jacket is formed of stainless steel or tin-plated steel. The expandable metal jacket can have diamond-shaped passages with the open diagonals D sized between 0.5 and 1.75 mm to determine the mesh dimensions or the pore sizes. In this case, all types of corrosion are avoided. It has been demonstrated that, with the diamond-shaped passages in the given dimension range, very good filtration performances and good through-passage values can be produced.

Particularly favorable filtering results can be attained preferably when the filter mat is constructed of multiple layers. At least one polyester fleece and/or a glass fiber mat and/or a paper fleece and/or a high-grade steel-polyester-mixed fabric or metal wire gauze or plastic gauze are used as layers.

In another preferred embodiment of the filter element of the present invention, the bent-down or rounded off ends of the expandable metal jacket extend at an acute angle relative to one another. One further bordering of the adhesive bed can be provided by the ends of the filter mat extending at an acute angle relative to one another. On the basis of this arrangement, the adhesive material, supported and guided by the bent-down or rounded off ends of the expandable metal jacket, fills the bed between the ends and the first fold of the filter mat. A leak-proof seal of the interior of the filter element is attained in relation to the surrounding area.

In one especially preferred embodiment of the filter element of the present invention, a shell-like clamp is provided to further define the adhesive bed in which the ends of the filter mat and the expandable metal jacket engage. This clamp forms a longitudinal seam clamp allowing a pre-fixation of expandable metal jacket and filter mat. Then, the expandable metal jacket ends and filter mat ends are arranged in a V-shaped form as a casting channel for the adhesive, so that an adhesive bed of overall uniform configuration is formed. Depending upon the alignment of the opening of the shell-shaped member, in this case, the adhesive also can be fed from the inside of the filter element outward.

In a different, especially preferred embodiment of the filter element of the present invention, the connection produced by means of the adhesive bed forms a longitudinal seam. The seam is covered and protected from the surrounding environment by a fillet or crosspiece or web which engages with one surface in the longitudinal seam. Two options are attained in this manner, on the one hand protection of the adhesive seam from damage. On the other hand, in addition to the exterior of the expandable metal jacket, another labeling possibility for identification of the filter is attained. The web engaging in the adhesive seam consequently improves the hold of the adhesive in its bed. The adhesive of the filter element is formed preferably of a casting resin.

A second expandable metal jacket can be arranged in the interior of the filter element. The second metal jacket supports the filter mat on the inside, as compared with the support pipe already known in the state of the art. Improved filtering performance can be attained. Also, a simpler structural form of the filter element is obtained simultaneously.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
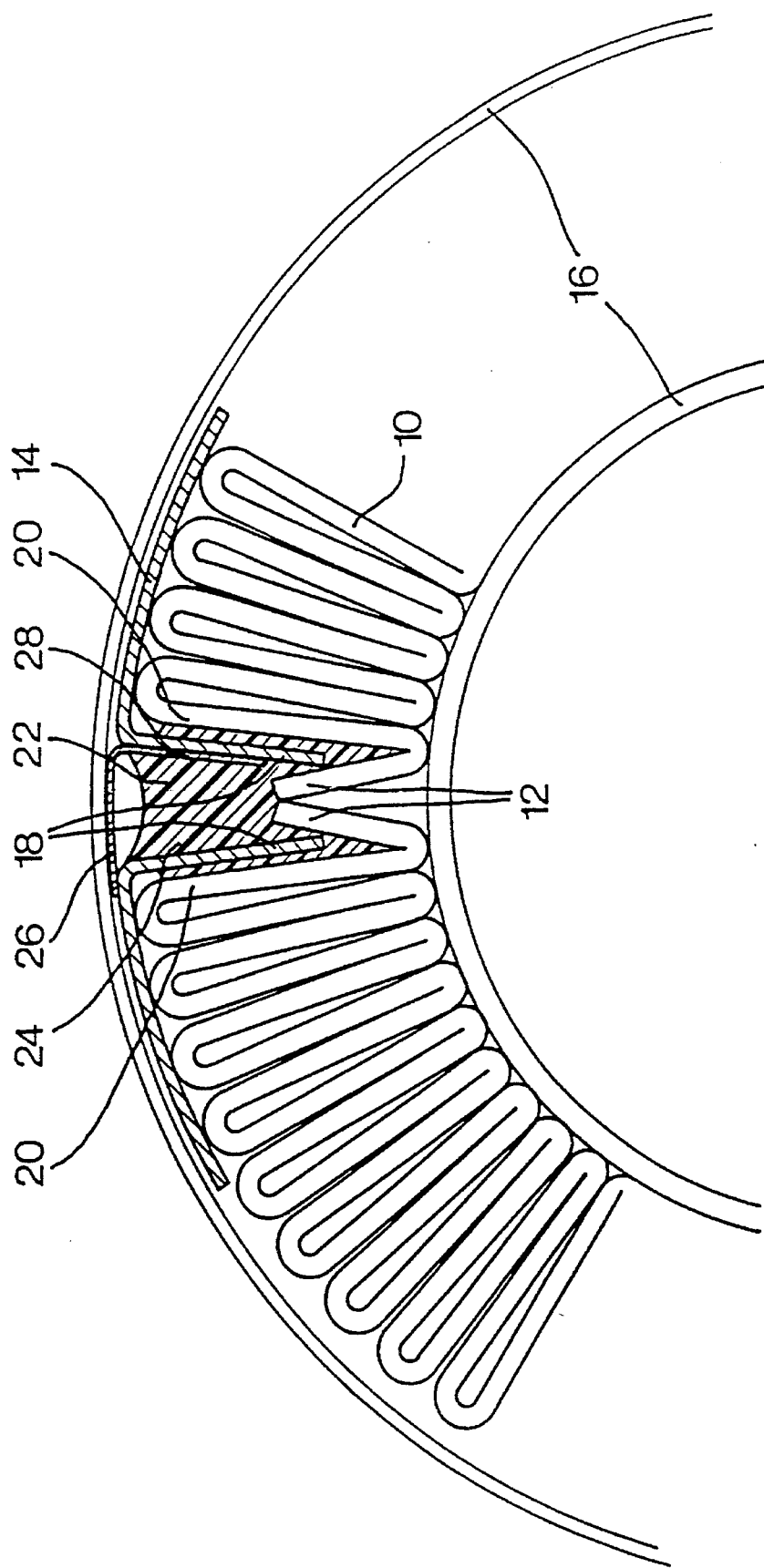
FIG. 1 is a partial plan view, partially in section, graphically illustrating a fiber element according to a first embodiment of the present invention.

The tubular filter element of FIG. 1 serves for the filtration of fluids/liquids, and incorporates a folded filter mat 10. Filter mat 10 is constructed of multiple layers (not shown). From the outside to the inside of the filter element, the mat includes the following layers:

1. polyester fleece,
2. glass fiber mat,
3. glass fiber mat,
4. paper fleece or polyester fleece, and
5. high-grade steel-polyester-mixed fiber fabric or metal wire fabric or plastic fabric.

The two ends 12 of filter mat 10 face one another at an acute angle relative to one another, and contact one another in a common longitudinal edge. The length of each of ends 12 is somewhat shorter than half of one folded flat portion of filter mat 10. On the outside, filter mat 10 is surrounded by a cylindrical expandable metal jacket 14. Expandable metal jacket 14 is stretched out somewhat, is provided with diamond-shaped passages, and is formed of a metal grid. The meshes of the metal grid have the following dimensions:

mesh length : 1.0 mm to 2 mm,
mesh width : 1.0 mm to 2 mm,
mesh opening:
along the open length
diagonals : 0.5 mm to 1.75 mm,
web width : 0.25 mm to 0.5 mm,
web thickness : 0.10 mm to 0.30 mm,
mesh grid thickness : 0.25 mm to 0.50 mm.

Expandable metal jacket 14 comprises stainless steel, for example of 1.4301 or 1.4306 by DIN 17440, or tin-plated steel. The standard formulas and components of such materials are the subject matter of DIN 791.

The two sealing or exterior casings 16 limit the relevant filter element on the ends, and are likewise of the aforementioned stainless steel plate, of tin-plated steel plate or of plastic. The two exterior casings 16 are connected leak-proof by a casting material (not shown) to filter mat 10 and expandable metal jacket 14. Mat ends 12 are then locked in place by the adhesive, or are locked in place by a longitudinal seam clamp. Fiber washing-out and fiber migration on the clean side of the filter are avoided.

In the interior of the filter element a supporting pipe (not shown) or an inner expandable metal jacket (not shown) or a combination of these two structural parts can be provided. Insofar as an inner expandable metal jacket is used, this element preferably has the following features:

mesh length : 0.75 mm to 2.5 mm,
mesh width : 0.75 mm to 2.5 mm,
mesh opening:
length of open diagonals : 0.4 mm to 1.5 mm,
web width : 0.10 mm to 0.40 mm,
web thickness : 0.10 mm to 0.25 mm,
mesh grid thickness : 0.2 mm to 0.40 mm.

Likewise, a stainless steel or tin-plated steel is preferably used as the inner metal jacket material. Filter mat 10 in this case is arranged with its folds on the outside and inside of the interior or exterior expandable metal jacket 14.

The two ends 18 of expandable metal jacket 14 are turned toward each other, are bent down or rounded off, and extend toward a point which would be formed by the two ends. The distance between ends 18 is selected such that ends 12 of filter mat 10 can engage in the space which is created. Furthermore, the bent down or rounded off ends 18 in turn have a predeterminable axial distance away from the last completely folded over flat portion 20 of filter mat 10, which extends parallel to the one longitudinal web construction and its associated end 18. End members 18 are somewhat longer than half of the folded over flat portion 20.

End members 18 of expandable metal jacket form a filling cone for adhesive material 22 in the form of casting resin. A longitudinal barrier in the form of a bed 24 is provided for adhesive material 22. A part of the bed is defined by the bent down or rounded off ends 18 of expandable metal jacket 14 which are turned toward one another. The volume of casting resin which is provided is then distributed between the two ends 18 such that, even before hardening, a portion of the casting resin comes into setting with the two flat portions 20 of filter mat 10 facing each other, as well as with the pointed folds between the two ends 12 and the associated flat portion 20 of filter mat 10. Viewed from the outside inward, the longitudinal seam in the form of the hardened adhesive 22 forms a convex curvature. This curve is obtained by a capillary effect exerted on the side arcs of bent down or rounded off ends 18 of the expandable metal jacket.

The connection produced by adhesive material 22, which forms the longitudinal seam, is protected from the surrounding environment by a web 26. Web 26 engages with its surface 28 in this longitudinal seam. The angled web 26 is arranged with its surface 28 on one bent down or rounded off end 18 of expandable metal jacket 14. The web free surface protects the adhesive flat area from the surrounding environment.

The following exemplary embodiments are explained solely insofar as they essentially differ from the already presented exemplary embodiment of FIG. 1. Hereinafter the identical parts are indicated with the same references, but increased by 100. Otherwise, the embodiments shown beforehand are also suitably valid in terms of the modified embodiments.

Figure 2:
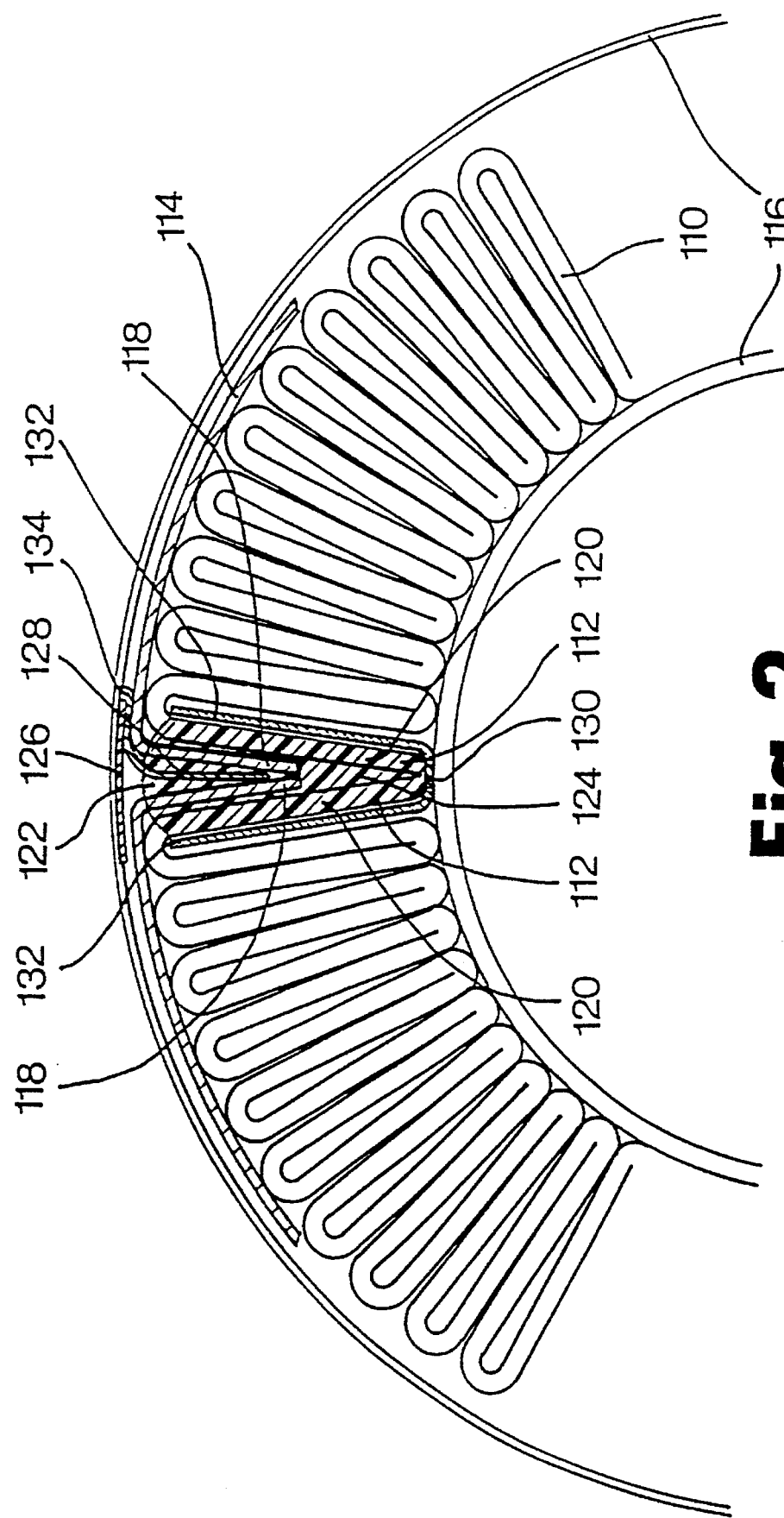
FIG. 2 is a partial plan view, partially in section, graphically illustrating a filter element according to a second embodiment of the present invention.

The embodiment of FIG. 2 has a shell-like clamp 130, as an additional part of bed 124, in the form of a longitudinal seam clamp. In the free opening of clamp 130, the two of flat portions 120 engage with both of their ends 112. Likewise the two ends 118 of expandable metal jacket 114 are held in clamp 130. The two of flat portion 120 lie between the two barrier or wall-like surfaces 132 and the ends 118 arranged adjacent to them. The two barrier or wall-like surfaces 132 and also ends 112 and 118 of filter mat 110 and expandable metal jacket 114 extend at an acute angle relative to one another. The free opening diameter of shell 130 is turned to face the surrounding environment. Between the two ends, the web 126 is arranged at an acute angle along one edge of ends 118. Ends 118 are aligned to come into contact with one another. Web surface 128 is arranged in the middle in bed 124. One of the folding points 134 is in position on a part of the outside periphery of expandable metal jacket 114. The adhesive material 122 forming the longitudinal seam engages through the two end segments of flat portions 120 of filter mat 110.

Figure 3:
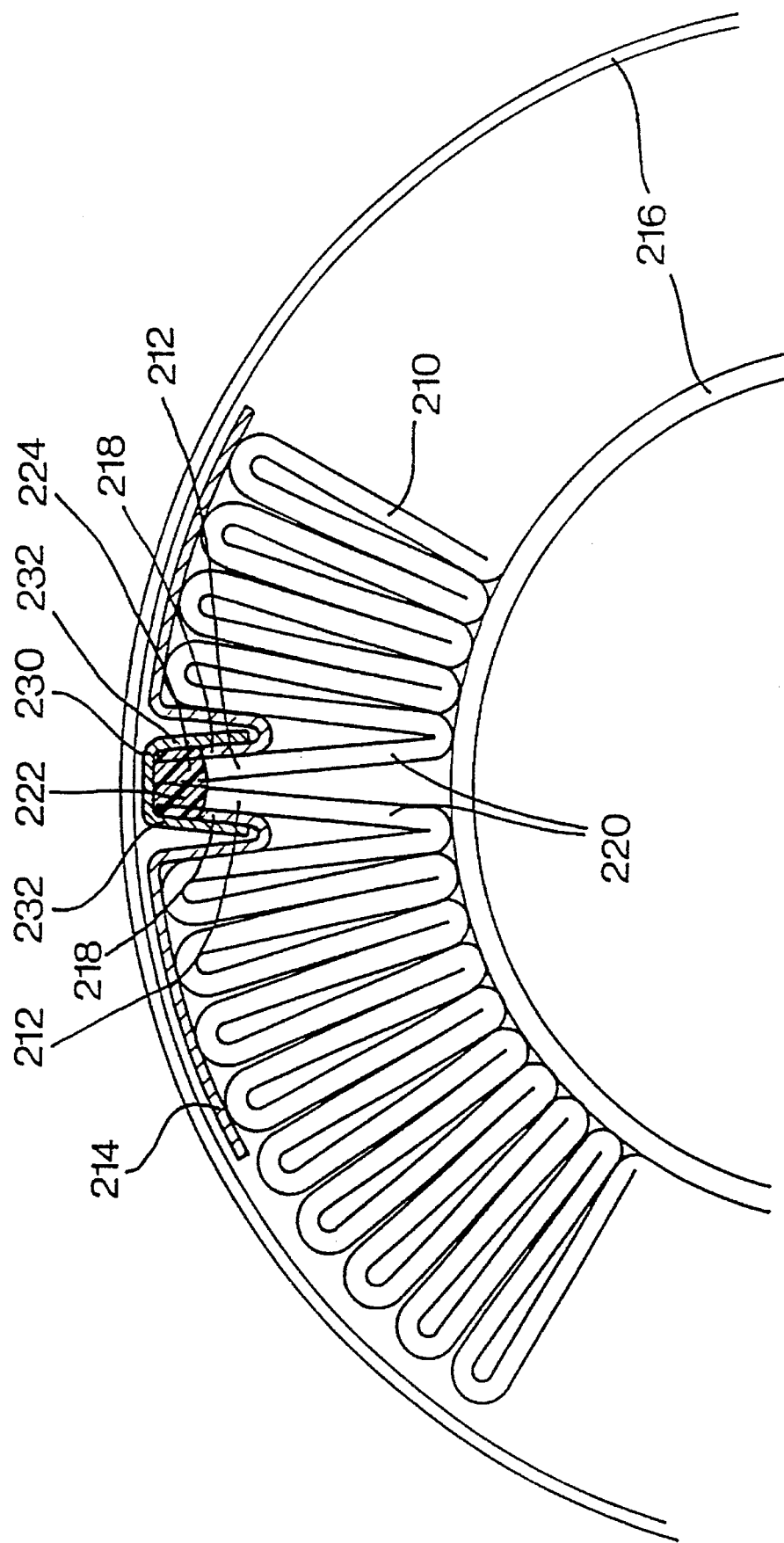
FIG. 3 is a partial plan view, partially in section, graphically illustrating a filter element according to a third embodiment of the present invention.

In the embodiment of FIG. 3, the shell-like longitudinal seam clip 230 is set in place from the outside. The clip opening diameter is turned toward the inside of the filter element. The free ends 212 of filter mat 210 in this embodiment are once again folded back and engage between clip barriers 232 with the pointed surface portions 220. Portions 220 are inclined toward one another in clip 230. The bed 224 is filled with adhesive 222. The adhesive flat area of the bottom surface of clip 230 is covered protectively to protect it from the surrounding environment.

Some other one- or two-component adhesive or a fusion adhesive can be used in place of a casting resin adhesive material. Since the relevant expandable metal jacket has the utmost smooth inside and outside surfaces, filter mats can be used which are also very sensitive, but are of optimal filtration performance.

In the described exemplary embodiments, the expandable metal jacket surrounds the folded filter mat with a cylindrical peripheral covering. The expandable metal jacket protects the filter mat at least on one side, either from the outside surrounding atmosphere or in the interior on the inside of the filter. Thus, for special filtration uses, the flow direction be reversed, such that the fluid/liquid volume to be filtered flows through the filter from the inside of the filter element to the outside into the surrounding environment. Under high strains, the aforementioned supporting pipe would be applied against the outside of the filter element from the outside. The expandable metal jacket would protectively surround the inside of the filter element. Such a construction still falls within the scope of the present invention when another expandable metal jacket (not shown) is arranged between the supporting pipe on the exterior and the filter mat located between the two.

In the embodiment shown in FIG. 3, the ends of filter mat 220 are guided between ends 218 of the expandable metal jacket and the sides of longitudinal seam clamps 230. This construction has been proved as advantageous in that tearing out of the filter mat during the interval of reversal is absolutely avoided.

While various embodiments have been chosen to illustrate the invention, it will be understood by those skilled in the art that various changes and modifications can be made therein without departing from the scope of the invention as defined in the appended claims.

What is claimed is:

1. A tubular filter element for filtering fluids, comprising:

a zigzag folded filter mat having rounded off mat ends, said mat ends facing one another and being located in fixed positions;

a bed of adhesive connecting and bonding said mat ends; and a cylindrical expandable metal grid surrounding at least one side of said filter mat and forming a first expandable metal jacket, said metal jacket having a small mesh width and protectively surrounding said filter mat, said metal jacket having bent jacket ends defining said bed of adhesive therebetween and extending radially inwardly, said jacket ends facing one another to define a space therebetween receiving said mat ends, said mat ends and said jacket ends extending substantially parallel.

2. A tubular filter element according to claim 1 wherein said expandable metal jacket is formed of a material selected from the group consisting of stainless steel and tin plated steel, and comprises diamond-shaped passages, said diamond-shaped passages having diagonals between about 0.5 and 1.75 millimeters determining the mesh width.

3. A tubular filter element according to claim 1 wherein said filter mat comprises multiple layers of polyester fleece, glass fiber mat, paper fleece and a fabric selected from the group consisting of high-grade steel-polyester-mixed fiber fabric, metal wire fabric and plastic fabric.

4. A tubular filter element according to claim 1 wherein said jacket ends extend at an acute angle toward one another; and a boundary of said bed of adhesive is defined by said mat ends extending at an acute angle relative to one another.

5. A tubular filter element according to claim 1 wherein a shell-shaped clamp forms a boundary of said bed of adhesive, said bed of adhesive engaging said mat ends and said jacket ends.

6. A tubular filter element according to claim 1 wherein said bed of adhesive produces a connection and forms a longitudinal seam between said jacket ends and said mat ends; and a web covers and protects said bed of adhesive from surrounding atmosphere, said web having a web member in said longitudinal seam.

7. A tubular filter element according to claim 1 wherein said bed of adhesive is formed of a material selected from the group consisting of casting resin, one and two component adhesive and fusion adhesive.

8. A tubular filter element according to claim 1 wherein a second expandable metal jacket is arranged inside the filter mat to support inwardly said filter mat.

\* \* \* \* \*